(12) United States Patent
Kim et al.

(10) Patent No.: US 9,519,543 B2
(45) Date of Patent: *Dec. 13, 2016

(54) METHOD AND APPARATUS FOR IMAGE SEARCH USING FEATURE POINT

(71) Applicant: Samsung Electronics Co., Ltd., Suwon-si (KR)

(72) Inventors: Sang-Wook Kim, Seoul (KR); Seon Min Rhee, Seoul (KR); Yong Beom Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

This patent is subject to a terminal disclaimer.

(21) Appl. No.: 14/628,959

(22) Filed: Feb. 23, 2015

(65) Prior Publication Data

US 2015/0169410 A1    Jun. 18, 2015

Related U.S. Application Data

(62) Division of application No. 13/214,689, filed on Aug. 22, 2011, now Pat. No. 8,971,638.

(30) Foreign Application Priority Data

Nov. 15, 2010   (KR) .................. 10-2010-0113342

(51) Int. Cl.
| | | |
|---|---|---|
| *G06K 9/46* | (2006.01) | |
| *G06K 9/50* | (2006.01) | |
| *G06F 11/14* | (2006.01) | |
| *G06F 17/30* | (2006.01) | |

(52) U.S. Cl.
CPC ....... *G06F 11/1412* (2013.01); *G06F 11/1402* (2013.01); *G06F 17/30153* (2013.01); *G06F 17/30247* (2013.01); *G06K 9/46* (2013.01); *G06K 9/4671* (2013.01)

(58) Field of Classification Search
CPC .... G06F 11/1412; G06F 11/1402; G06K 9/46; G06K 9/4671
USPC .................. 382/118, 181, 190, 195, 201
See application file for complete search history.

(56) References Cited

U.S. PATENT DOCUMENTS

| | | | |
|---|---|---|---|
| 5,802,199 A | 9/1998 | Pare et al. | |
| 6,445,834 B1* | 9/2002 | Rising, III | ........ G06F 17/30256 382/190 |
| 6,609,134 B1 | 8/2003 | Chang et al. | |
| 7,386,170 B2 | 6/2008 | Ronk et al. | |
| 8,971,638 B2* | 3/2015 | Kim | ..................... G06K 9/4671 382/201 |

(Continued)

FOREIGN PATENT DOCUMENTS

| | | |
|---|---|---|
| JP | 11-312171 A | 11/1999 |
| JP | 2008-59563 A | 3/2008 |

(Continued)

*Primary Examiner* — Samir Ahmed
(74) *Attorney, Agent, or Firm* — NSIP Law

(57) ABSTRACT

A method and an apparatus search an image using a feature point. The image search method extracts at least one feature point from an image and describes the extracted at least one feature point in stages, thereby generating a hierarchical feature point descriptor. In addition, the method may search for information matching the feature point descriptor from a local database (DB) included in a terminal or a remote DB included in a server.

11 Claims, 6 Drawing Sheets

(56) References Cited

U.S. PATENT DOCUMENTS

| | | | |
|---|---|---|---|
| 2002/0019819 A1* | 2/2002 | Sekiguchi | G06F 17/30256 |
| 2009/0083228 A1* | 3/2009 | Shatz | G06F 17/30743 |
| 2010/0027895 A1 | 2/2010 | Noguchi et al. | |
| 2010/0129000 A1* | 5/2010 | Strom | G06T 9/00 |
| | | | 382/253 |
| 2010/0226575 A1* | 9/2010 | Grzeszczuk | G06F 17/30256 |
| | | | 382/190 |
| 2010/0303354 A1* | 12/2010 | Reznik | G06K 9/4642 |
| | | | 382/168 |
| 2010/0310174 A1* | 12/2010 | Reznik | G06K 9/4642 |
| | | | 382/190 |
| 2011/0164826 A1 | 7/2011 | Noguchi et al. | |
| 2011/0182516 A1* | 7/2011 | Iwai | G06K 9/6256 |
| | | | 382/190 |
| 2011/0216977 A1 | 9/2011 | Yu et al. | |
| 2012/0191287 A1 | 7/2012 | Shin et al. | |

FOREIGN PATENT DOCUMENTS

| | | |
|---|---|---|
| KR | 1999-013091 A | 2/1999 |
| KR | 1999-0071352 A | 9/1999 |
| KR | 2000-0019231 A | 4/2000 |
| KR | 2000-0054864 A | 9/2000 |
| KR | 2003-0009674 A | 2/2003 |
| KR | 10-2004-0018395 A | 3/2004 |
| KR | 10-0516289 B1 | 9/2005 |
| KR | 10-2006-0083762 A | 7/2006 |
| KR | 10-2009-0051430 A | 5/2009 |
| KR | 10-2009-0065099 A | 6/2009 |
| WO | WO 2009/133856 | 11/2009 |
| WO | WO 2010/032297 | 3/2010 |

\* cited by examiner

METHOD AND APPARATUS FOR IMAGE SEARCH USING FEATURE POINT

CROSS-REFERENCE TO RELATED APPLICATIONS

This present application is a divisional of U.S. patent application Ser. No. 13/214,689 filed on Aug. 22, 2011, which claims the benefit under 35 U.S.C. §119(a) of Korean Patent Application No. 10-2010-0113342, filed on Nov. 15, 2010, in the Korean Intellectual Property Office, the entire disclosure of which is incorporated herein by reference for all purposes.

BACKGROUND

1. Field

Example embodiments of the following description relate to a method and apparatus for searching an image using a feature point, and more particularly, to a method and apparatus which compress a feature point extracted from an image and search the image using the compressed feature point.

2. Description of the Related Art

With an increase in use of mobile terminals, such as smart phones, the frequency of image searching using the mobile terminals is increasing. Users may photograph an object using a mobile terminal equipped with a camera. Then, the mobile terminal may search an image of the photographed object.

In this instance, for higher search efficiency, the mobile terminal may search the image using information representing the object, rather than using the entire image of the photographed object.

Since a storage medium of the mobile terminal has a limited capacity, the mobile terminal may not be able to store image search results with respect to all photographed objects. To solve the limitation, the mobile terminal may transmit a search query to a remote server and receive a result of the search query. In this case, however, since the search query corresponding to the object has a large volume, communication costs may increase.

Accordingly, there is a need for a method for searching for an image with a high search efficiency and a low communication cost.

SUMMARY

The foregoing and/or other aspects are achieved by providing a terminal for searching an image, including a feature point extraction unit to extract a feature point from an input image; a descriptor generation unit to generate a hierarchical feature point descriptor by compressing the extracted feature point in stages; and an information search unit to search for information matching the feature point descriptor from a local database (DB) included in the terminal or a remote DB included in a server.

The foregoing and/or other aspects are achieved by providing a server performing an image searching method, the server including a descriptor reception unit to receive a feature point descriptor in a compressed state from a terminal connected via a network; a feature point recovery unit to recover a feature point by decompressing the compressed feature point descriptor; and an information search unit to search for information matching the feature point in a remote (DB) based on the recovered feature point.

The foregoing and/or other aspects are also achieved by providing an image searching method performed by a terminal, the method including extracting a feature point from an input image; generating a hierarchical feature point descriptor by compressing the extracted feature point in stages; and searching for information matching the feature point descriptor from a local (DB) included in the terminal or a remote DB included in a server.

The foregoing and/or other aspects are also achieved by providing an image searching method performed by a server, the method including receiving a feature point descriptor in a compressed state from a terminal connected via a network; recovering a feature point by decompressing the compressed feature point descriptor; and searching for information matching the feature point from a remote (DB) based on the recovered feature point.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
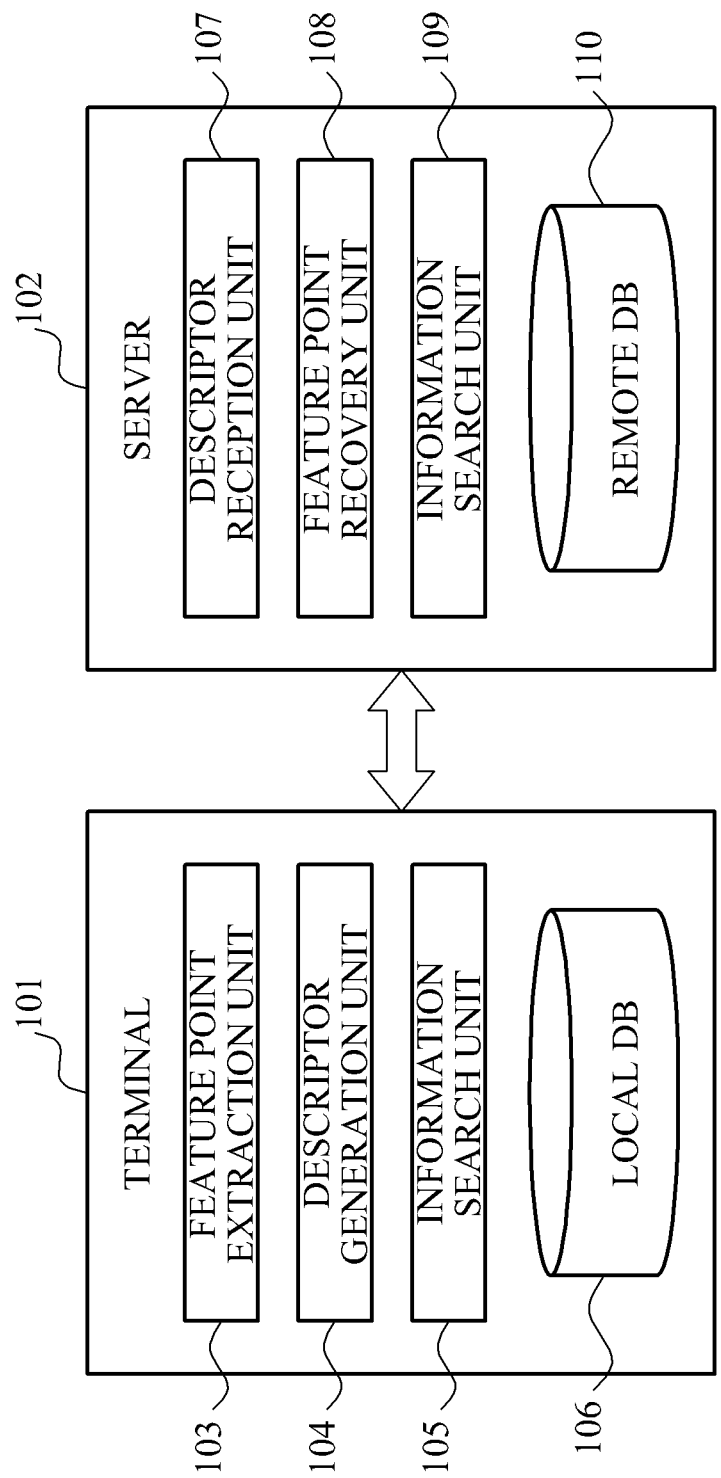
FIG. 1 illustrates a diagram showing detailed structures of a terminal and a server to perform an image search method according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures. An image search method according to example embodiments may be performed by a terminal and a server.

FIG. 1 illustrates a diagram showing detailed structures of a terminal 101 and a server 102 to perform the image search method according to example embodiments.

Referring to FIG. 1, the terminal 101 may include a feature point extraction unit 103, a descriptor generation unit 104, an information search unit 105, and a local database (DB) 106. Although not shown, the terminal 101 may be equipped with a camera capable of photographing an object, and a network device to execute data communication with the server 102.

The feature point extraction unit 103 may extract a feature point of the object from an image or photograph taken by the camera. The feature point refers to a point used for recognition and tracking of the object, out of all points constituting the image of the object. Therefore, identity of objects may be determined through comparison of feature points of the objects. Since hundreds to thousands of feature points of the object may be extracted from one image, calculation quantity will increase considerably to process all the extracted feature points. However, when a feature point is compressed to reduce the calculation quantity, processing accuracy may be reduced.

Therefore, the descriptor generation unit 104 may generate a feature point descriptor which is hierarchical, by compressing the extracted feature point in stages. The feature point descriptor denotes information that describes the feature point through an orientation and a position of at least one cell located around the feature point. For example, when the feature point descriptor is generated using 16 cells around the feature point, a 128-dimensional (D) descriptor (16 cells*8 orientations) is required to express 8 orientations of the feature point. Additionally, for example, when 8 bits are necessary to express a 1D descriptor, in total, 1024 bits (16 cells*8 orientations*8 bits) may be necessary to express the orientation of the feature point. When a position (x, y) of the feature point is expressed by 4 bits, in total, 64 bits (16 cells*4 bits/cell) may be necessary to express the position of the feature point. Thus, the feature point descriptor may include the 1024 bits for expressing the orientation of the feature point, and the 64 bits for expressing the position of the feature point.

However, when the feature point descriptor is generated with respect to a single feature point by considering all of the cells as having the same importance, data processing efficiency may be reduced. Therefore, the descriptor generation unit 104 may generate the feature point descriptor by describing the feature point in stages, by order of importance. Here, the descriptor generation unit 104 may describe a description equation of at least one grid cell located around the feature point.

For example, the descriptor generation unit 104 may generate the feature point descriptor by describing grid cells located around the feature point, in order of distance value with respect to the feature point. This will be explained more specifically with reference to FIG. 2.

As a further example, the descriptor generation unit 104 may generate the feature point descriptor by describing grid cells located around the feature point, in order of orientation-related statistics. This will be explained more specifically with reference to FIG. 3.

According to the example embodiments, the descriptor generation unit 104 may perform scalable compression with respect to the feature point, thereby generating the feature point descriptor by prioritizing using the description equation of the grid cell determined to be important in the feature point. That is, the descriptor generation unit 104 may generate the feature point descriptor by placing a higher priority on the description equation of the grid cell determined to be important in the feature point.

Additionally, the descriptor generation unit 104 may calculate an error rate of the feature point descriptor constituted by the description equation of the grid cell at a present time. The descriptor generation unit 104 may determine generation of the description equation of the grid cell, by additionally describing the grid cell according to whether the error rate is within a range of an allowed error threshold. When the error rate is equal to or lower than the allowed error threshold, the descriptor generation unit 104 may stop the additional description of the grid cell. Conversely, when the error rate is greater than the allowed error threshold, the descriptor generation unit 104 may generate the description equation of the grid cell by additionally describing the grid cell until the error rate becomes equal to or lower than the allowed error threshold.

That is, when generating the feature point descriptor, the descriptor generation unit 104 does not consider all the feature points from the first. The descriptor generation unit 104 performs compression with a low bit at first, and then performs additional compression considering the error rate, so that the error rate of the feature point descriptor gradually decreases. As a result, the error rate will be unquestionably minimized when the description equations of all grid cells located around the feature point are determined. However, since calculation becomes complicated in this case, the feature point descriptor may be generated by determining the description equation of the grid cell until the error rate becomes equal to or lower than the allowed error threshold.

The information search unit 105 may search for information matching the feature point descriptor from the local DB 106 included in the terminal 101 or from the remote DB 110 include in the server 102. The information search unit 105 may recognize an object showing the same features as the object contained in the image from the local DB 106 or the remote DB 110, based on similarity of the feature point descriptor, and may search for information on the recognized object.

In addition, the information search unit 105 may search for the information matching the feature point descriptor from the local DB 106 of the terminal 101 first. When the required search result is unavailable, the information search unit 105 may search for the information matching the feature point descriptor from the remote DB 110 of the server 102. In other words, when the information matching the feature point descriptor is not searched from the local DB 106, the information search unit 105 may request the server 102 for an information search, using the feature point descriptor, and receive the information matching the feature point descriptor from the server 102. Here, the information search unit 105 performs the search in order of the description equations constituting the feature point descriptor. When the search result and a predetermined reference value are unmatched, the information search unit 105 may perform the search in stages, using the other description equations constituting the feature point descriptor.

However, the above operation of the information search unit 105 is suggested only by way of example. Depending on the image search method, the server 102, as opposed to the terminal 101, may search for the information matching the feature point descriptor from the starting point. The information search procedure of the server 102 will now be described.

Referring to FIG. 1, the server 102 may include a descriptor reception unit 107, a feature point recovery unit 108, an information search unit 109, and the remote DB 110.

The descriptor reception unit 107 may receive the feature point descriptor in a compressed state from the terminal 101. For example, when the information matching the feature point descriptor is not searched from the terminal 101, the descriptor reception unit 107 may receive the compressed feature point descriptor from the terminal 101.

In this case, the terminal 101 may generate the feature point descriptor by describing the feature point extracted from the image, in stages, by order of importance. For example, the terminal 101 may generate the feature point descriptor by describing grid cells located around the feature point, in order of distance value with respect to the feature point. As another example, the terminal 101 may generate the feature point descriptor by describing the grid cells located around the feature point in order of orientation-related statistics.

The feature point recovery unit 108 may recover the feature point by decompressing the feature point descriptor in the compressed state. For example, the feature point recovery unit 108 may further decompress a descriptor of an error signal constituting the feature point descriptor.

The information search unit 109 may search for the information matching the feature point from the remote DB 110 using the recovered feature point.

Figure 2:
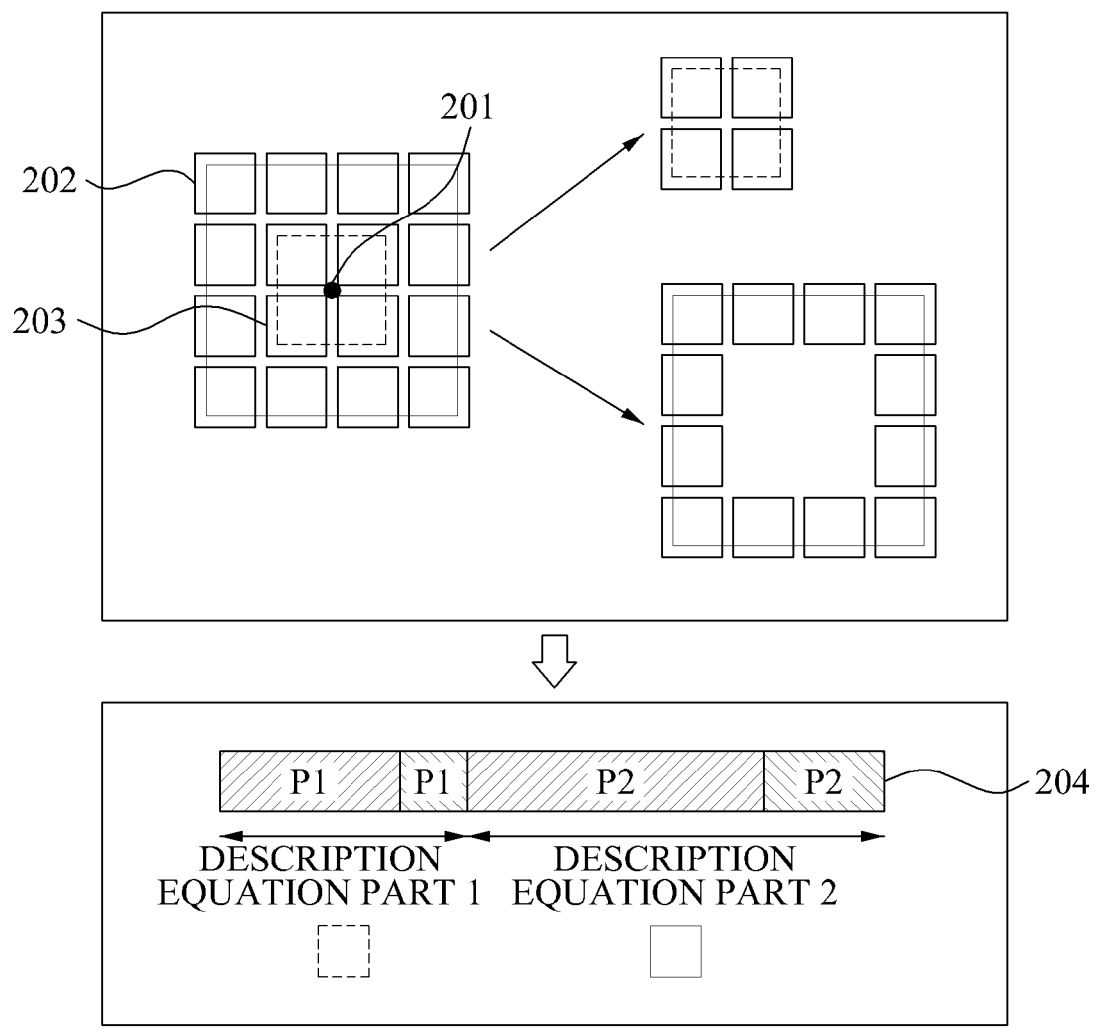
FIG. 2 illustrates a diagram showing a method of generating a feature point, according to example embodiments.

FIG. 2 illustrates a diagram showing a method of generating a feature point, according to example embodiments.

A terminal, for example, terminal 101 of FIG. 1, according to the present embodiment may generate a hierarchical feature point descriptor by compressing a feature point extracted from an image, in stages. For example, the terminal may generate the feature point descriptor by describing the feature point in stages, by order of importance. In this case, the terminal may generate the feature point descriptor by describing grid cells located around the feature point in order of distance value with respect to the feature point.

More specifically, the terminal may generate a feature point descriptor 204 using a window including 16*16 pixels located around a feature point 201. Here, the terminal may divide the window into a pair of grid cells 202 and 203, each of a size 4*4. After calculating an orientation histogram of the pair of grid cells 202 and 203, the terminal may express each of the pair of grid cells 202 and 203 by description equations in 8 orientations. Here, the description equations may be components of the feature point descriptor 204.

The terminal may generate the feature point descriptor 204 using the description equations of the respective grid cells 202 and 203, by describing the grid cells 202 and 203 in order of the distance value between the grid cells 202 and 203 and the feature point 201. Referring to FIG. 2, since the grid cell 203 is located closer to the feature point 201 than the grid cell 202, the description equation of the grid cell 203 is described first, and the description equation of the grid cell 203 is described next, thereby generating the feature point descriptor 204. In other words, the terminal may prioritize to consider a position closer to the feature point 201 when generating the feature point descriptor 204 with respect to the feature point 201. That is, the terminal may place a higher priority on a position closer to the feature point 201 when generating the feature point descriptor 204 with respect to the feature point 201.

Figure 3:
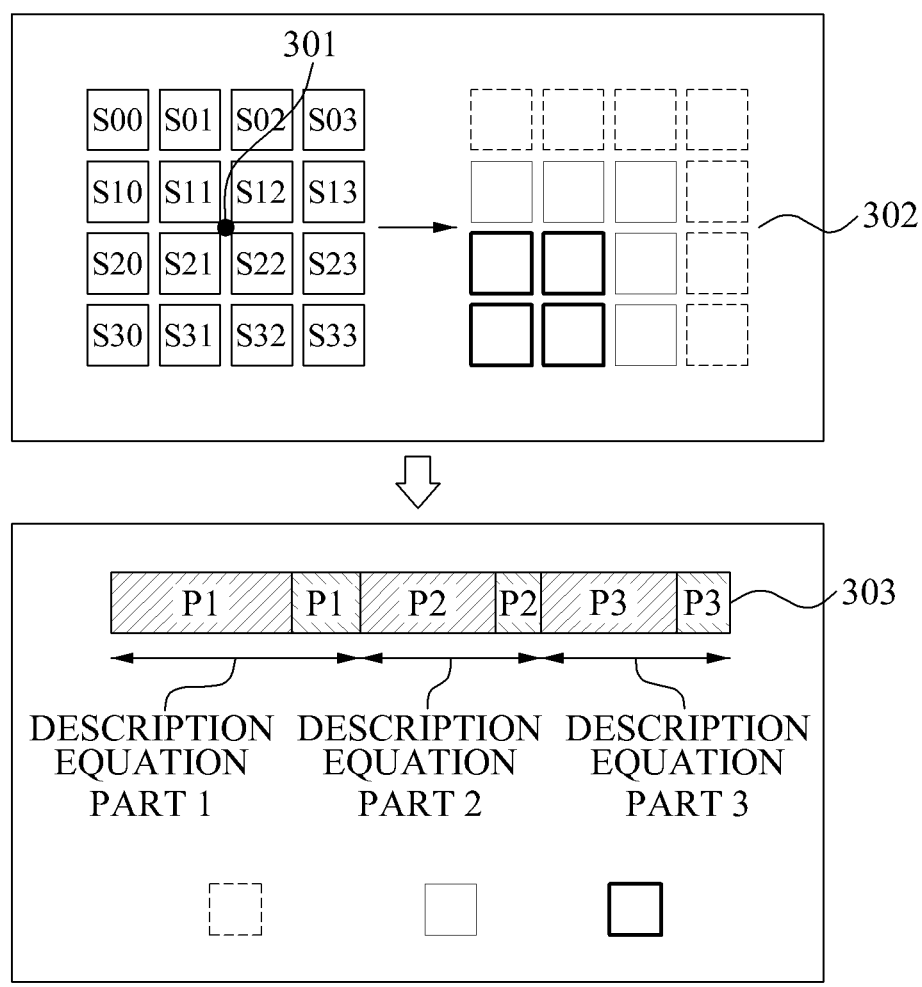
FIG. 3 illustrates a diagram showing a method of generating a feature point, according to other example embodiments.

FIG. 3 illustrates a diagram showing a method of generating a feature point, according to other example embodiments.

A terminal, for example, terminal 101 of FIG. 1, according to the present embodiments may generate a hierarchical feature point descriptor by compressing a feature point extracted from an image, in stages. For example, the terminal may generate the feature point descriptor by describing the feature point by order of importance. Here, the terminal may generate the feature point descriptor by describing grid cells located around the feature point in order of orientation-related statistics.

More specifically, the terminal may generate a feature point descriptor 303 using a window including 16*16 pixels located around a feature point 301. Here, the terminal may divide the window into a grid cell 302 of a size 4*4. After calculating an orientation histogram of the grid cell 302, the terminal may express the grid cell 302 by description equations in 8 orientations. Here, the description equations may be components of the feature point descriptor 303.

Next, the terminal may calculate statistics, that is, a mean and a distribution, from the orientation histogram of the grid cell 302. Therefore, the terminal may generate the feature point descriptor 303 by arranging description equations of the grid cell 302 in order of greater mean or distribution.

Figure 4:
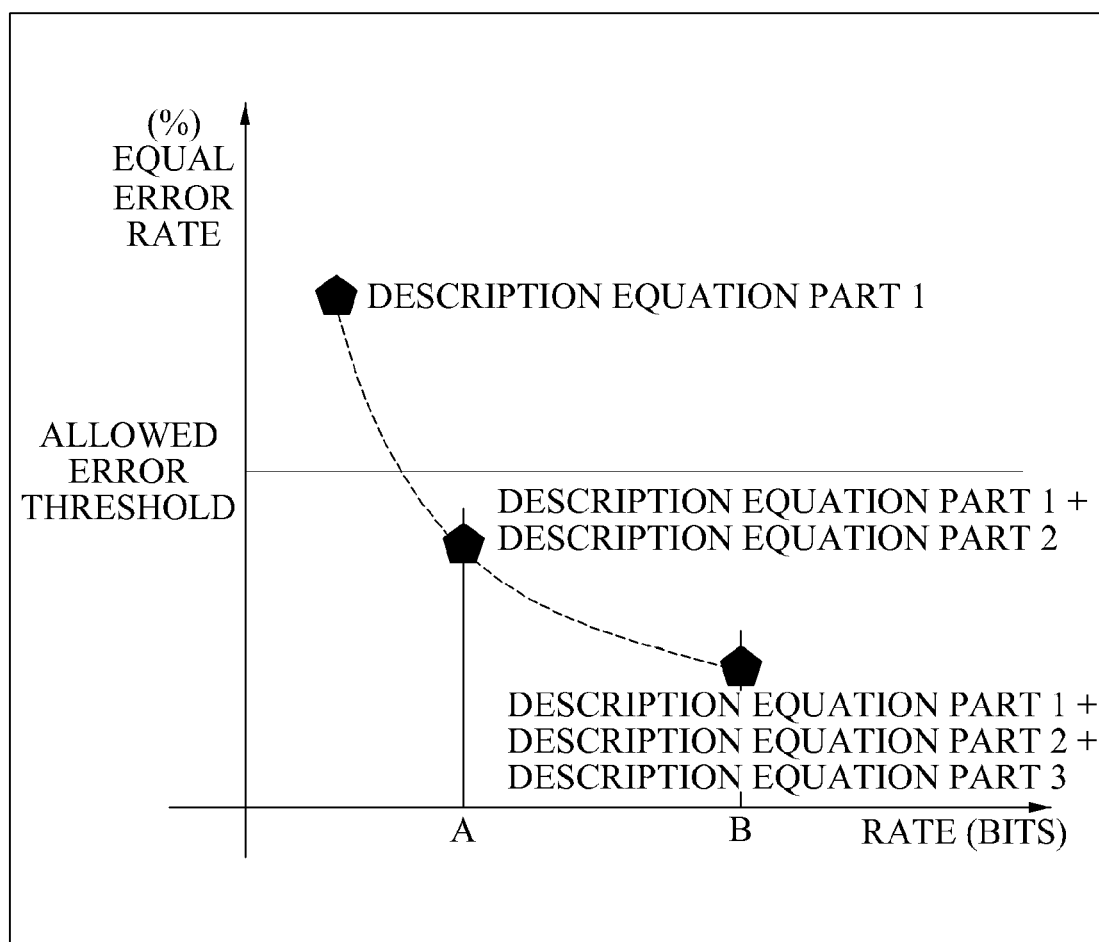
FIG. 4 illustrates a diagram showing an error rate in a case of using a feature point descriptor according to example embodiments.

FIG. 4 illustrates a diagram showing an error rate in a case of using a feature point descriptor according to example embodiments.

The feature point descriptor may be generated by describing a feature point in stages, by order of importance. Referring to FIG. 4, the error rate is shown in the case of using the feature point descriptor described in stages. When the feature point descriptor includes only a description equation part 1 of a single grid cell, the error rate is higher than the allowed error threshold. When the feature point descriptor includes the description equation part 1 and a description equation part 2 of two grid cells, the error rate is lower than the allowed error threshold. When the feature point descriptor includes three grid cells, the error rate may be further reduced. However, the calculation quantity increases. Accordingly, the feature point descriptor may include description equations of grid cells generated until the error rate becomes equal to or lower than the allowed error threshold, rather than description equations of all grid cells.

Figure 5:
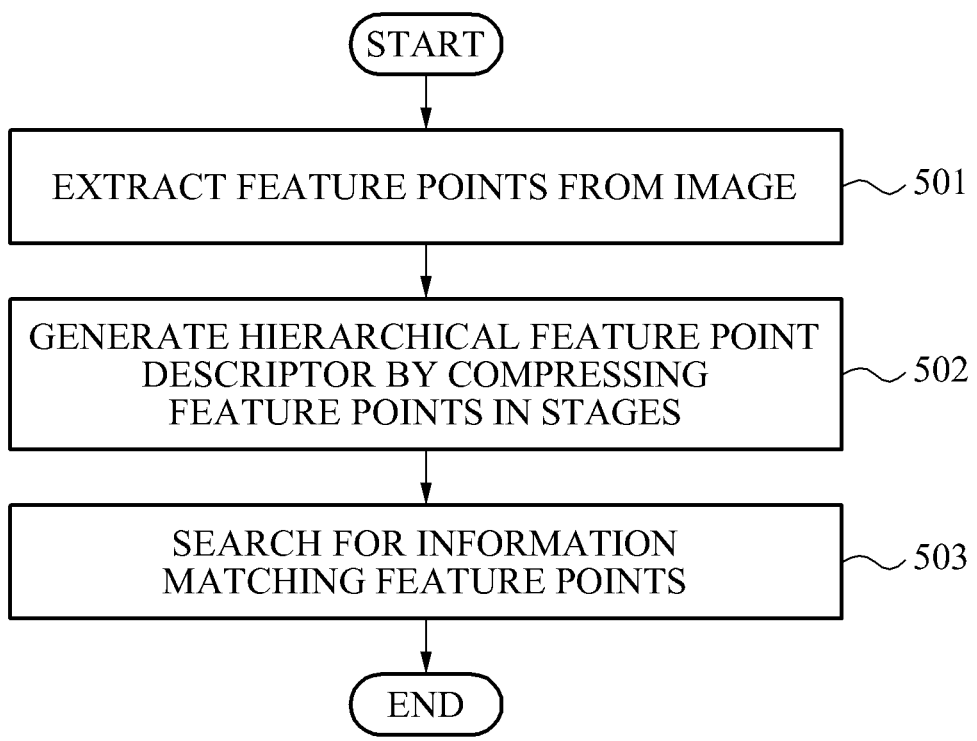
FIG. 5 illustrates a flowchart of an image search method performed by a terminal, according to example embodiments.

FIG. 5 illustrates a flowchart of an image search method performed by a terminal 101, according to example embodiments.

The terminal 101 may extract a feature point from an input image in operation 501.

The terminal 101 may generate a hierarchical feature point descriptor by compressing the extracted feature point in stages, in operation 502. Here, the terminal 101 may describe the feature point by order of importance to generate the feature point descriptor.

For example, the terminal 101 may generate the feature point descriptor by describing grid cells located around the feature point in order of distance value with respect to the feature point. As a further example, the terminal 101 may generate the feature point descriptor by describing the grid cells located around the feature point in order of orientation-related statistic. In addition, the terminal 101 may calculate an error rate of the feature point descriptor using description equations of the grid cells located around the feature point, and may further describe the description equations of the grid cells based on the error rate.

The terminal 101 may search for information matching the feature point descriptor from a local DB thereof or a remote DB included in a server, in operation 503. For example, the terminal 101 may search for the information first from the local DB and, when the required search result is unavailable, next from the remote DB 110 of the server. Here, the terminal 101 may perform searching in stages, for example, using a part of the feature point descriptor first and then using the other part of the feature point descriptor according to a search result.

Figure 6:
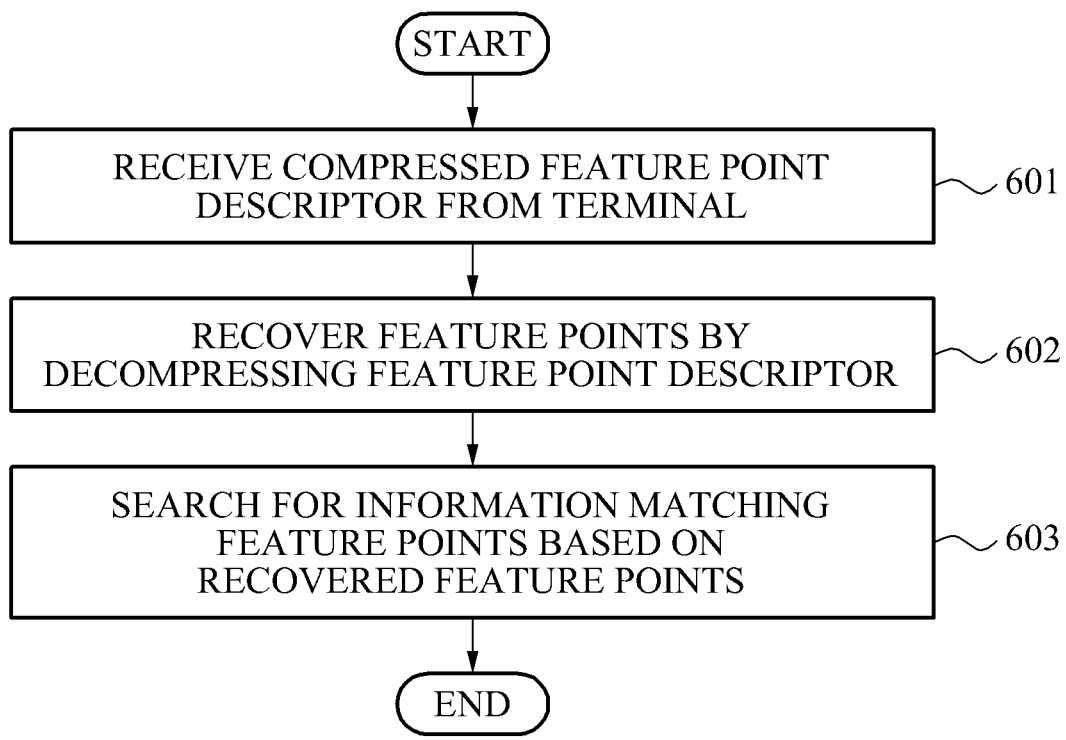
FIG. 6 illustrates a flowchart of an image search method performed by a server, according to example embodiments.

FIG. 6 illustrates a flowchart of an image search method performed by a server 102, according to example embodiments.

The server 102 may receive a feature point descriptor in a compressed state from a terminal connected via a network, in operation 601. The terminal may generate the feature point descriptor by describing a feature point extracted from an image in stages, by order of importance. More specifically, the terminal may generate the feature point descriptor by describing grid cells located around the feature point in order of distance value with respect to the feature point. Alternatively, the terminal may generate the feature point descriptor by describing the grid cells in orientation-related statistic.

The server 102 may recover the feature point by decompressing the feature point descriptor in the compressed state, in operation 602. The server 102 may decompress the feature point descriptor in order of grid cells constituting the feature point descriptor, and may further decompress the grid cells according to an error rate of the decompression result.

The server 102 may search for information matching the feature point from a remote DB using the recovered feature point, in operation 603.

The other details not described with reference to FIGS. 5 and 6 may be understood through the description with reference to FIGS. 1 through 4.

According to the example embodiments described above, a feature point descriptor is generated by compressing a feature point of an object to be searched in stages, and searching for information on the object using the feature point descriptor. Therefore, image search efficiency may be increased.

Also, since description equations of grid cells constituting the feature point descriptor are generated until an error rate of the feature point descriptor is within a range of an allowed error threshold, calculation quantity may be reduced.

In addition, the information on the object is searched first from a terminal and then from a server according to the search result. Accordingly, the search may be performed more quickly.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

The operating method of the processor according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the processor supporting a terminal for searching an image, a server for searching an image, or an image searching method described herein.

Moreover, the terminal, for example, terminal 101 shown in FIG. 1, may include at least one processor to execute at least one of the above-described units and methods. The terminal 101 may be a mobile terminal. Moreover, the terminal 101 may be in communication with the server, for example, the server 102 shown in FIG. 1. The server 102 may include at least one processor to execute at least one of the above-described units and methods. The communication between the terminal 101 and the server 102 may be through a wired or a wireless network, or through other communication channels such as telephony, for example. Moreover, one or more terminals 101 may be in communication with one or more servers 102.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A server performing an image searching method, the server comprising:
a processor comprising:
a descriptor reception unit configured to receive a feature point descriptor in a compressed state from a terminal connected via a network;
a feature point recovery unit configured to recover at least one feature point by decompressing the compressed feature point descriptor; and
an information search unit configured to search for information matching the at least one feature point in a remote database (DB) based on the recovered at least one feature point,
wherein the terminal is configured to calculate an error rate of the feature point descriptor, and to determine whether to additionally describe at least one grid cell located around the at least one feature point based on the error rate, and
wherein the feature point descriptor is information that describes the at least one feature point through an orientation and a position of at least one grid cell located around the at least one feature point.

2. The server of claim 1, wherein the terminal generates a feature point descriptor by describing at least one feature point extracted from an image, in stages, by order of importance.

3. The server of claim 2, wherein the terminal generates the feature point descriptor by describing grid cells located around the at least one feature point in order of distance value with respect to the at least one feature point.

4. The server of claim 2, wherein the terminal generates the feature point descriptor by describing grid cells located around the at least one feature point in order of orientation-related statistics.

5. The server of claim 1, wherein the feature point recovery unit decompresses the feature point descriptor in order of grid cells constituting the feature point descriptor, and further decompresses the grid cells according to an error rate of a decompression result.

6. An image searching method performed by a server, the method comprising:

receiving, by the server, a feature point descriptor in a compressed state from a terminal connected via a network;

recovering, by the server, at least one feature point by decompressing the compressed feature point descriptor; and searching, by the server, for information matching the at least one feature point from a remote (DB) based on the recovered at least one feature point, wherein the terminal calculates an error rate of the feature point descriptor, and determines whether to additionally describe at least one grid cell located around the at least one feature point based on the error rate, and wherein the feature point descriptor is information that describes the at least one feature point through an orientation and a position of at least one grid cell located around the at least one feature point.

7. The image searching method of claim 6, wherein the terminal generates the feature point descriptor by describing the at least one feature point extracted from an image, in stages, by order of importance.

8. The image searching method of claim 6, wherein the terminal generates the feature point descriptor by describing grid cells located around the at least one feature point in order of distance value with respect to the at least one feature point.

9. The image searching method of claim 7, wherein the terminal generates the feature point descriptor by describing grid cells located around the at least one feature point in order of orientation-related statistic.

10. The image searching method of claim 7, wherein the recovering of the at least one feature point decompresses the feature point descriptor in order of grid cells constituting the feature point descriptor, and further decompresses the grid cells according to the error rate of a decompression result.

11. A non-transitory computer-readable storage medium storing instructions that, when executed by a processor, cause the processor to perform the method of claim 6.

* * * * *